Figure 3:
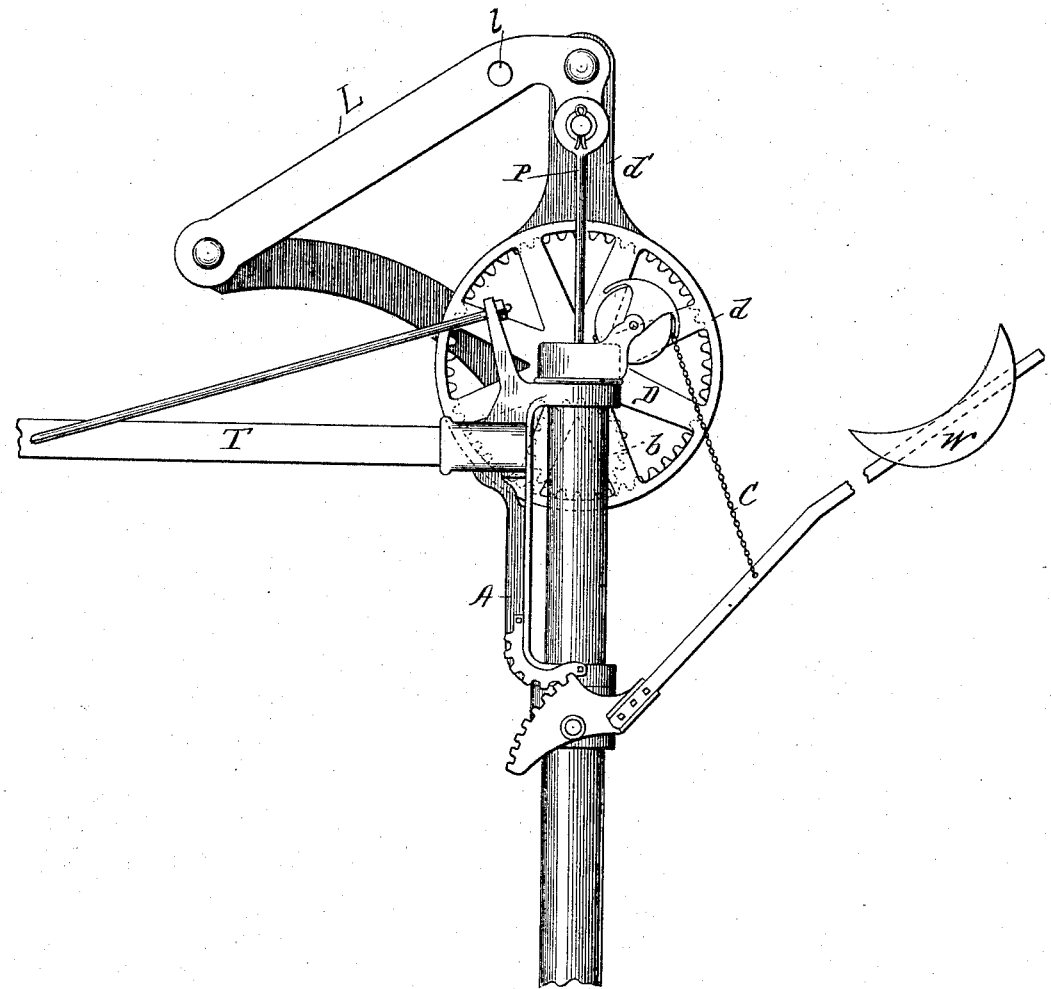

(No Model.)  2 Sheets—Sheet 1.
C. A. HOLCOMB.
MECHANICAL MOVEMENT.
No. 482,743. Patented Sept. 20, 1892.
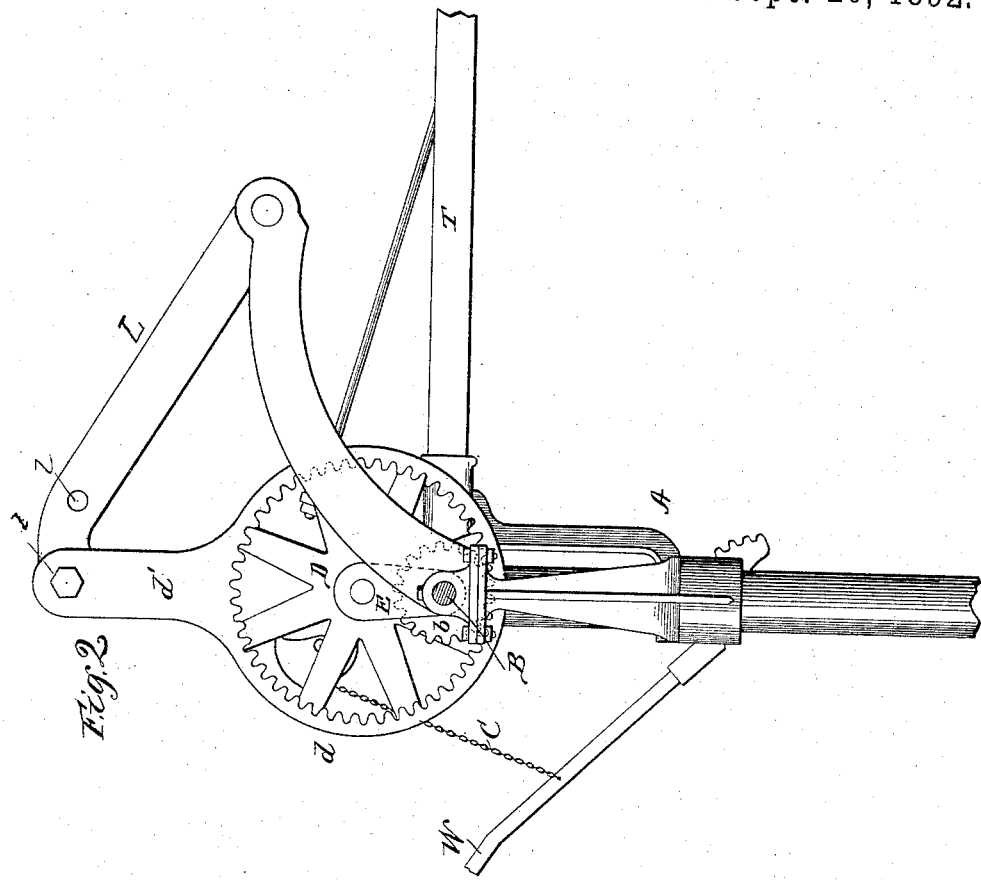
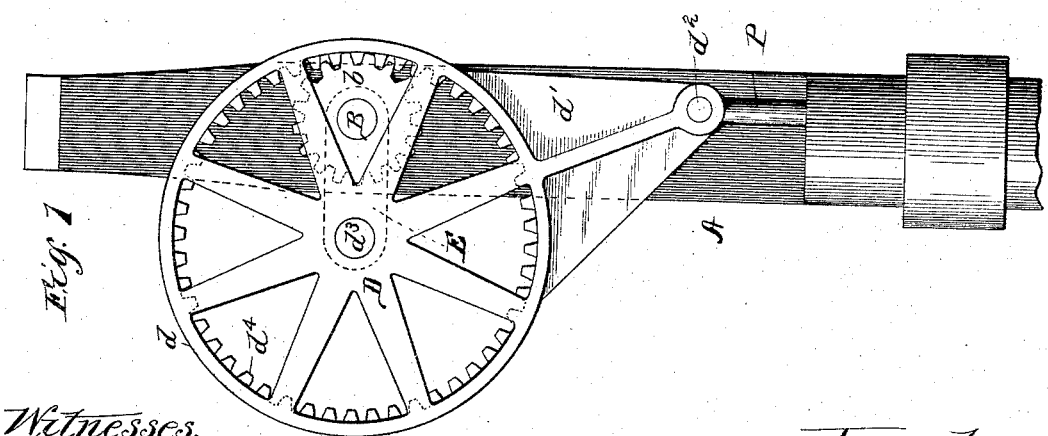
Witnesses.
Inventor.

(No Model.) 2 Sheets—Sheet 2.

C. A. HOLCOMB.
MECHANICAL MOVEMENT.

No. 482,743. Patented Sept. 20, 1892.

Witnesses.
Wm. M. Rheem.
Wm. F. Henning.

Inventor.
Clifford A. Holcomb.
By Lysander Hill.
his Atty.

UNITED STATES PATENT OFFICE.

CLIFFORD A. HOLCOMB, OF BELOIT, WISCONSIN.

MECHANICAL MOVEMENT.

SPECIFICATION forming part of Letters Patent No. 482,743, dated September 20, 1892.

Application filed May 19, 1892. Serial No. 433,627. (No model.)

*To all whom it may concern:*

Be it known that I, CLIFFORD A. HOLCOMB, a citizen of the United States of America, residing at Beloit, in the county of Rock and State of Wisconsin, have invented a new and useful Mechanical Movement, of which the following is a specification.

In the accompanying drawings, wherein like reference-letters indicate like parts, my new mechanical movement is illustrated in its application to the power devices of a pumping-windmill for the purpose of transmitting the rotary motion of the wind-wheel shaft into a reciprocating motion of the pump rod or plunger.

Figure 1 is a rear elevation of a portion of a windmill having the mechanical movement applied, as aforesaid, in the simplest form of embodiment; and Figs. 2 and 3 are respectively front and rear elevations of a portion of a windmill having said mechanical movement applied for the purpose aforesaid by means of an adjustable-lever device.

The windmill is not a part of my invention and is shown merely to illustrate one practical application thereof. For this purpose any form of windmill would answer. The form shown is a "solid-wheel" mill having a vertically-tubular turn-table A, a pivoted tail-vane T, a weight W to resist the lateral deflection of the wheel out of the wind, a cord or chain C, by which the wheel may be turned out of the wind by hand, a pump-rod P, and a wind-wheel shaft B. As shown, the wheel would be out of the wind with the tail-vane standing transverse to shaft B and the weight W at its extreme elevation.

The object of the invention is to transform the rotary motion of a revolving driving member (in this instance the wind-wheel shaft B) into a reciprocating motion of the driven member, (in this instance the pump-rod P.) This object I accomplish by the co-operation of three combined elements, viz: a pinion $b$, fixed on the end of shaft B, a lifting-plate D, articulated to the pump-rod, and a link E articulated to the shaft B or its pinion at one end and to the lifting-plate D (directly or indirectly) at the other end. In this combination two of the elements (the pinion and link) are old and well known, and therefore need no further description; but the lifting-plate D is a new element contrived by me for the purposes of this invention and the construction of which may be described, as follows: It consists, essentially, in a gear-wheel $d$, preferably having the gear internal, with a projecting arm $d'$ formed upon or attached to its rim and provided with means for articulating it to the driven member—for example, as shown at $d^2$. At a point $d^3$ centrally within the gear-rim the wheel $d$ is provided with means for the articulation of the link—for example, a stud adapted to enter a hole in the link, or a hole to receive a stud projecting from or a pin extending through the link.

The operation of the combination is as follows: The pinion $b$ is arranged to engage with the teeth $d^4$ of the plate D and is held in engagement therewith by the link E. The pinion being fixed in position and the plate free, the latter must yield, and, accordingly, the center of the plate travels around the center of the pinion on the link as a radius of motion. In doing this it oscillates both laterally and vertically, being held from rotation by the connection of the arm $d'$ to the driven member. Hence the driven member if confined by suitable guides to a movement in any given line, whether vertical, horizontal, or inclined, will be forced to reciprocate in that line.

In applying the device to a windmill to actuate a pump-rod the latter will, of course, be guided to a substantially-vertical line of movement, as shown. In such case, therefore, the arm $d'$ may be arranged either above or below the link. If the connection to the pump-rod is direct, as shown in Fig. 1, I prefer to arrange it below the link if indirect, by means of a lever L, as shown in Figs. 2 and 3, I prefer to arrange it above. In the latter case the traverse of the driven member may be varied in length by providing the lever L with a series of holes $l$ for connecting the end of the arm thereto and shifting the arm from one hole to another. In any case it may be varied by changing the size of the pinion and length of the link.

Having thus described my machine, what I claim as new, and desire to secure by Letters Patent, is—

1. As a new element in a mechanical movement, the plate D, constructed with the gear-rim $d^4$, the central means $d^3$ for connection by a link to the driving member, and the projecting arm $d'$, having means $d^2$ for connection to the driven member, substantially as described.

2. The combination of the driving member with the driven member by means of the pinion $b$, the link E, and the plate D, constructed as herein described, as and for the purpose set forth.

3. The new mechanical movement herein described, consisting, essentially, in the pinion $b$, the link E, and the peculiarly-constructed plate D, adapted to operate together, substantially as set forth.

CLIFFORD A. HOLCOMB.

Witnesses:
ROBT. TODD,
G. W. SPARKS.